United States Patent [19]

Frankel et al.

[11] Patent Number: 4,978,999

[45] Date of Patent: Dec. 18, 1990

[54] FIBER REINFORCED CLEANING BLADE

[75] Inventors: Neil A. Frankel, Rochester; Nero R. Lindblad, Ontario; Herbert C. Relyea, Webster; Robert J. Meyer, Penfield, all of N.Y.

[73] Assignee: Xerox Corporation, Stamford, Conn.

[21] Appl. No.: 338,698

[22] Filed: Apr. 17, 1989

[51] Int. Cl.$^5$ .......................... G03G 21/00; B32B 9/00
[52] U.S. Cl. .................................. 355/299; 15/256.51; 15/1.51; 428/290
[58] Field of Search ................ 428/244, 290; 355/296, 355/299; 15/100, 1.5 A, 1.5 R, 256.51

[56] References Cited

U.S. PATENT DOCUMENTS

| | | | |
|---|---|---|---|
| 2,767,529 | 10/1956 | Scott | 51/204 |
| 3,634,077 | 8/1968 | Sullivan | 15/100 |
| 3,635,556 | 1/1972 | Levy | 355/16 |
| 4,549,933 | 10/1985 | Judd et al. | 15/256.51 |
| 4,690,860 | 9/1987 | Radvan et al. | 428/290 |
| 4,695,269 | 9/1987 | Tassone et al. | 428/290 |
| 4,786,541 | 11/1988 | Nishimura et al. | 428/290 |
| 4,819,026 | 4/1989 | Lange et al. | 355/15 |

OTHER PUBLICATIONS

Impregnated Poromeric Material Cleaning Blade, Spencer et al., Xerox Disclosure Journal, vol. 1, No. 4, Apr. 1976, p. 79.
Nylon Fiber Reinforcement for Polyurethane Composites, Cordova et al., Polymer Composites, Aug. 1987, vol. 8, No. 4, pp. 253-255.

Primary Examiner—A. T. Grimley
Assistant Examiner—William J. Royer
Attorney, Agent, or Firm—Mark Costello

[57] ABSTRACT

A cleaning blade is provided incorporating fiber fillers oriented in a single direction in an elastomeric matrix. In use, the cleaning blade is mounted for cleaning operation in a manner orienting the fiber fillers generally parallel to process direction. The material thereby provided is resistant to damage, and is relatively stiff in the process direction, while relatively conformable in the lateral direction.

11 Claims, 1 Drawing Sheet

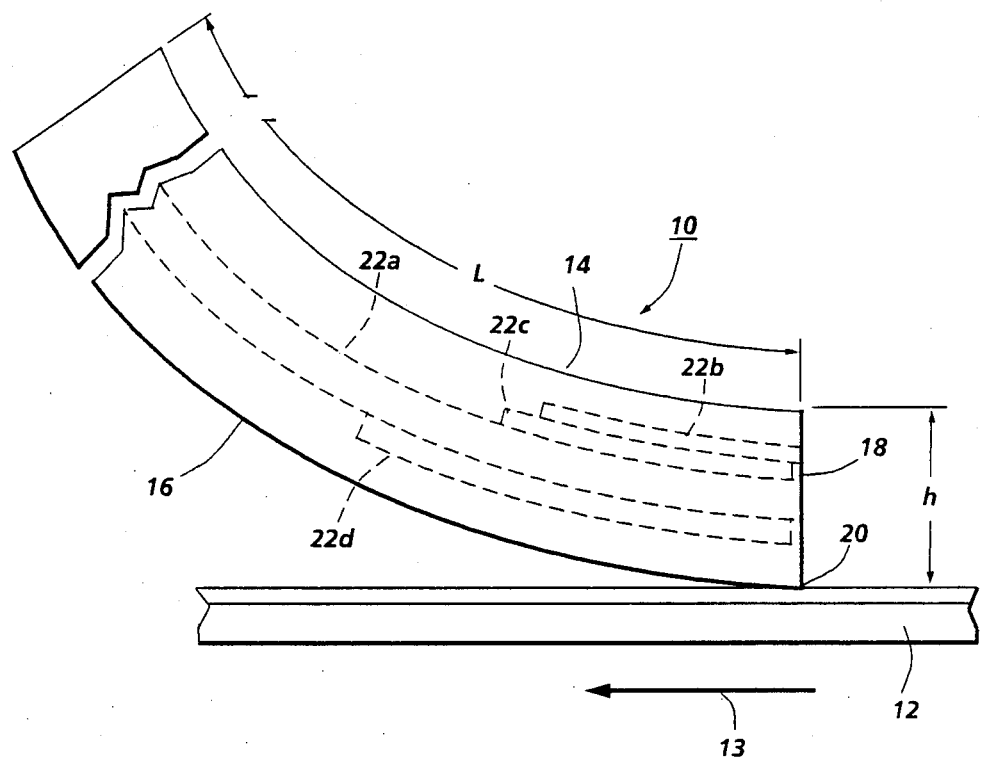
FIGURE

FIBER REINFORCED CLEANING BLADE

This invention relates to reproduction apparatus and more particularly to cleaning apparatus for removing residual toner from a surface, including a fiber reinforced cleaning blade, where the fibers are oriented in a single direction.

BACKGROUND OF THE INVENTION

In electrophotographic applications such as xerography, a charge retentive surface is electrostatically charged and exposed to a light pattern of an original image to be reproduced to selectively discharge the surface in accordance therewith. The resulting pattern of charged and discharged areas on that surface form an electrostatic charge pattern (an electrostatic latent image) conforming to the original image. The latent image is developed by contacting it with a finely divided electrostatically attractable powder imaging material referred to as "toner". Toner is held on the image areas by the electrostatic charge on the surface. Thus, a toner image is produced in conformity with a light image of the original being reproduced. The toner image may then be transferred to a substrate (e.g., paper), and the image affixed thereto to form a permanent record of the image to be reproduced. Subsequent to transfer, excess toner left on the charge retentive surface is cleaned from the surface. The process is well known and useful for light lens copying from an original and printing applications from electronically generated or stored originals, where a charged surface may be imagewise discharged in a variety of ways. Ion projection devices where a charge is imagewise deposited on a charge retentive substrate operate similarly.

Although a preponderance of the toner forming the image is transferred to the paper during the transfer step, some toner invariably remains on the charge retentive surface, it being held thereto by relatively high electrostatic and/or mechanical forces. Additionally, paper fibers, Kaolin and other debris have a tendency to be attracted to the charge retentive surface. It is essential for optimum operation that the toner remaining on the surface be cleaned thoroughly therefrom. Blade cleaning is a highly desirable method for removal of residual toner and debris (hereinafter, collectively referred to as "toner") from a charge retentive surface, because it provides a simple, inexpensive structure compared to the various fiber brush or magnetic brush cleaners that are well known for dry electrophotography. In a typical application, a relatively thin elastomeric blade member is provided and supported adjacent and transversely across a moving charge retentive surface with a blade edge chiseling or wiping toner from the surface. Subsequent to release of toner from the surface, the released toner accumulating adjacent to the blade is transported away from the blade area by a toner transport arrangement or by gravity. Unfortunately, blade cleaning suffers from certain deficiencies, primarily resulting from the frictional sealing contact which must be maintained between the blade and the charge retentive surface. Friction between the surfaces causes wearing away of the blade edge. Cleaning blades might also be used for the removal of toner from the surface of a detoning roll used to collect toner from the bristles of a brush cleaner, as shown for example in U.S. Pat. No. 4,819,026 to Lange et. al., and assigned to the same assignee as the present application.

In addition to the problem of wear, which is more or less predictable over time, blades are also subject to unpredictable failures. The impact from carrier beads remaining on the charge retentive surface subsequent to development may damage the blade, and sudden localized increases in friction between the blade and surface may cause the phenomenon of tucking, where the blade cleaning edge becomes tucked underneath the blade, losing the frictional sealing relationship required for blade cleaning. Additionally, slight damage to the contacting edge of the blade appears to eventually initiate tearing sites. These problems require removal and replacement of the blade.

Investigation into the characteristic of cleaning blade performance has shown that lateral conformance of the blade, i.e., conformance of the blade across the imaging surface, is generally given by $$\epsilon \propto 1/E$$

where $\epsilon$ is blade conformance in microns;

E is the Young's modulus for a given elastomer.

A high value for lateral conformance is very desirable, and accordingly, for a given blade, Young's modulus should be small.

It has also been determined that for the blade to optimally respond to roughness in the imaging surface, particularly at high speeds, the resonant frequency of the blade must be as high as possible. Resonant frequency of a blade is given by $$\omega_0 \propto \sqrt{E}$$

where $\omega_0$ is the resonant frequency of the blade.

A high resonant frequency for optimal frequency response is very desirable, and accordingly, for a given blade, Young's modulus for the selected elastomer should be large.

It can be seen that the use of isotropic materials, such as the urethane cleaning blades currently used in electrophotographic cleaning processes, requires a trade off in the selection of materials having a Young's modulus that satisfactorily meets both the lateral conformability requirement, and the resonant frequency requirements.

"Impregnated Poromeric Material Cleaning Blade," Xerox Disclosure Journal, Spencer et. al., Vol. 1, No. 4, Apr. 1976, p. 79, suggests a cleaning blade composition of non-woven polyester fibers bound together in polyurethane, for the improvement of abrasion resistance, hardness, resilience, and load bearing capacity. U.S. Pat. No. 2,767,529 to Scott suggests a doctor blade for paper making machines made of metal or layers of fabric bonded together by synthetic resin. U.S. Pat. No. 3,635,556 to Levy suggests a backing pad made of a carbon filled plastic foam material. "Nylon Fiber Reinforcement for Polyurethane Composites," Polymer Composites, Cordova et. al., Vol. 8, No. 4, Aug. 1987, pp. 253–255, suggests polyurethane thermoset material with a nylon fiber filler for improved impact strength, impact fatigue and decreased stress cracking.

SUMMARY OF THE INVENTION

In accordance with the invention there is provided an improved cleaning blade for removal of dry toner and debris from a charge retentive surface, formed from a fiber reinforced elastomer, where the fibers are oriented through the material in a single direction to provide a blade that is relatively stiff in the process direction and highly conformable in the transverse direction.

In accordance one aspect of the invention, a cleaning blade is provided by incorporating fiber fillers oriented in a single direction in a matrix of thermoset or thermoplastic elastomers. In use, the cleaning blade is mounted for cleaning operation in a manner orienting the fiber fillers generally parallel to process direction. The material thereby has a relatively high Young's modulus in the process direction, and a relatively low Young's modulus in the transverse or lateral direction. This provision allows the blade to have a high lateral conformance, while maintaining a high resonant frequency.

In addition to providing a material stiff in the process direction and highly conformable in the transverse direction, fiber filled elastomers offer significant advantages in toughness, i.e., resistance to tearing and abrading wear, an important cause of blade failure, by distributing force over a larger area of the blade when a high friction area is encountered.

These and other aspects of the invention will become apparent from the following description used to illustrate a preferred embodiment of the invention read in conjunction with the accompanying drawing in which:

The Figure shows a cleaning blade with fiber reinforcement oriented generally parallel to the process direction.

With reference now to the drawing where the showings are for the purpose of illustrating a preferred embodiment of the invention and not for limiting same, the Figure shows a cross sectional view of an elastomeric cleaning blade, in accordance with the invention, where the fibers are oriented through an elastomeric matrix in a single or unitary direction, generally parallel to the process direction to provide a blade that is relatively stiff in the process direction and highly conformable in the transverse direction.

As illustrated in the Figure, blade 10, for cleaning the imaging surface of photoreceptor 12 moving in direction 13, is provided with upper and lower blade surfaces 14 and 16, having a length L, and front face 18, having a height h. In combination with lower surface 16, front face 18 forms cleaning edge 20 in cleaning contact with photoreceptor 12. In accordance with the invention, fibers 22 are oriented through the blade generally parallel to upper and lower blade surfaces 14 and 16, and with their lengths oriented generally along the process direction. The blade support member, which supports the blade in frictional engagement with the photoreceptor 12, is not shown. Blade 10 and cleaning edge 20 extend across photoreceptor 12, transverse to the direction of photoreceptor movement.

The blade is made from an elastomeric matrix material filled or mixed with fiber reinforcement, with the fibers oriented through the blade generally parallel to upper and lower blade surfaces 14 and 16, and length L, and generally perpendicular to height h. As shown, a variety of fiber types may be used either alone or in combination. For example, fiber 22a extends completely through the material, terminating at front face 18. Fiber 22b is a relatively short fiber that also terminates at the front face 18. Fibers 22c and 22d, having varying lengths might not terminate at the front face, but slightly behind the face, so that the fiber matrix interface may not serve as an initiation site for cracking or tearing. A single layer of fibers at uniform spacing from upper and lower blade surfaces 14 and 16, may be used, as may multi layers or dispersions through the material. As used herein, the phrase "generally parallel to the process direction" refers to orientation of fibers in the elastomeric matrix material parallel to the length L of the blade.

Satisfactory matrix materials for the cleaning blade include, liquid polymers that can wet the filler, generally having a viscosity less than about 60,000 c.p., and having an unfilled Young's modulus value in the range of 100–1200 psi including thermoset and thermoplastic elastomers. Known blade materials include, but are not limited to, urethane resins including caprolactones, polyesters and polyethers, polysiloxane rubber, polytetrafluorethylene resin, polytrifluorchloroethylene resin, styrenebutadiene rubber, nitrile rubber, nitrosilicone rubber, polyethylene rubber and blends and mixtures and copolymers thereof.

Satisfactory fiber filler materials include high aspect ratio fillers (high ratio of length to diameter), having an aspect ration of approximately greater than 10:1, and generally having a higher Young's modulus than the selected matrix material. Generally, the Young's modulus of the fiber filler materials should exceed the Young's modulus of the fiber filler materials should exceed the Young's modulus of the matrix material, and typically be at least twice the modulus of the matrix material. The diameter of the fiber is desirably about the same diameter as the toner particle that will be cleaned from the surface. Fiber materials that may serve as reinforcement fibers that may be suitable include but are not limited to glass, carbon, graphite, mineral, nylon, polyesters, polyurethane terephthalate, boron, silicon carbide, aramid, ceramic and metal fibers. The length of the fibers used is variable with the fiber, the process used for forming the fiber reinforced blade material, and the desired reinforcement effect. Fibers may range from relatively short lengths, with respect to the blade length l, to lengths which are coextensive the blade. The fiber is selected based on its Young's modulus, resistance to attack by corona byproducts, desired blade lubricity, photoreceptor abrasion and compatibility with the matrix material. Certain materials may require coating with coupling agents or adhesives to obtain satisfactory bonding with the matrix material.

The elastomer matrix may be filled with the fiber filler material with a recommended range of 0.5% to 20% by volume. The elastomer matrix is filled with fiber material to obtain a Young's modulus in the process direction greater than 500 psi, with the value of Young's modulus selected in accordance with the blade application. Satisfactory blade construction may include, but is not limited to, fibers having a Young's modulus in the range of $10^4$ to $10^6$ psi, having a fiber diameter of between 10 $\mu$m and 20 $\mu$m, and filling the elastomeric matrix material to 3 to 5% by volume.

A variety of techniques may be used to fill an elastomeric matrix material with fibers oriented in a specific direction. Sheets of the matrix material incorporating the fiber reinforcement may be produced, and blades cut from the material to provide the desired shape and size. In one possible fabrication method, a plurality of fibers are arranged through and across a mold, oriented in a single direction, while the matrix material in liquid form is poured over the fibers. When the material sets, blades may be cut to size and shape, with fibers oriented as desired. This method of manufacturing the oriented fiber blade allows for close control of fiber spacing and positioning.

In another fabrication method fibers may be dropped into a moving sheet of matrix material. Movement of the matrix material tends to orient the fiber in the direction of movement. When the material sets, blades may be cut to size and shape, with fibers oriented as desired.

In yet another fabrication method, spin casting apparatus is used, wherein the matrix material is forced into a spinning mold. Fibers tend to orient in the matrix material parallel to the direction of the matrix tend to orient in the matrix material parallel to the direction of the matrix motion. When the material sets, blades may be cut to size and shape, with fibers oriented as desired.

Of course, the fiber reinforced blade material may also include other fillers/modifiers used to achieve desired blade characteristics, including for example, known lubricants for lubricating the blade at the photoreceptor interface, or fillers for varying the modulus of the blade.

The invention has been described with reference to a preferred embodiment. Obviously modifications and uses in other printing industry applications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. In an electrostatographic device, a cleaning blade for frictional cleaning engagement with an imaging surface moving in a process direction to remove residual toner therefrom, said cleaning blade comprising:
   a blade body formed from an elastomeric matrix material, having a generally rectangular cross section including upper and lower parallel surfaces, and a leading face, said leading face and lower surface forming a cleaning edge;
   a fiber reinforcement material, mixed with said elastomeric matrix material, fibers of the fiber reinforcement materials having a generally unitary orientation through said elastomeric matrix material, whereby said fibers are oriented parallel to said upper and lower parallel surfaces and perpendicular to said leading face.

2. The cleaning blade as defined in claim 1 wherein the elastomeric matrix material has an unfilled Young's modulus in the range of approximately 100 psi to 1200 psi.

3. The cleaning blade as defined in claim 1 wherein the fiber reinforcement material has a Young's modulus greater than the Young's modulus of the elastomeric matrix material.

4. The cleaning blade as defined in claim 1 wherein the fiber reinforcement material mixed with said elastomeric matrix material, increases the Young's modulus of the cleaning blade in the process direction.

5. The cleaning blade as defined in claim 1 wherein the fiber reinforcement material has a relatively high aspect ratio.

6. The cleaning blade as defined in claim 1 wherein the fiber reinforcement material has a high aspect ratio greater than approximately 10:1.

7. The cleaning blade as defined in claim 1 wherein said elastomeric matrix material is selected from the group consisting of urethane resins including caprolactones, polyesters and polyethers, polysiloxane rubber, polytetrafluorethylene resin, polytrifluorchloroethylene resin, styrenebutadiene rubber, nitrile rubber, nitrosilicone rubber, polyethylene rubber.

8. The cleaning blade as defined in claim 1 wherein said fiber reinforcement material is selected from the group consisting of glass, carbon, graphite, mineral, nylon, polyesters, polyurethane terephthalate, boron, silicon carbide, aramid, ceramic and metal fibers.

9. In an elctrostatographic device, a cleaning blade for frictional cleaning engagement with an imaging surface moving in a process direction to remove residual toner therefrom, said cleaning blade comprising:
   a blade body formed from an elastomeric matrix material, having a generally rectangular cross section including upper and lower parallel surfaces, and a leading face, said leading face and lower surface forming a cleaning edge;
   a fiber reinforcement material, mixed with said elastomeric matrix material, fibers of the fiber reinforcement materials having a generally unitary orientation through said elastomeric matrix material, whereby said fibers are oriented parallel to said upper and lower parallel surfaces and perpendicular to said leading face, and
   said fiber reinforcement material positioned within said elastomeric matrix material to terminate before extending through said leading face, whereby a uniform surface of said elastomeric matrix material is maintained.

10. The cleaning blade as defined in claim 9 wherein said fiber reinforcement material is dispersed through said blade body.

11. In an electrostatographic device, a cleaning blade for frictional cleaning engagement with an imaging surface moving in a process direction to remove residual toner therefrom, said cleaning blade comprising:
   a blade body formed from an elastomeric matrix material, having a generally rectangular cross section including upper and lower parallel surfaces, and a leading face, said leading face and lower surface forming a cleaning edge;
   a fiber reinforcement material, mixed through said elastomeric matrix material, fibers of the fiber reinforcement materials having a generally unitary orientation through said elastomeric matrix material and dispersed therethrough, whereby said fibers are oriented parallel to said upper and lower parallel surfaces and perpendicular to said leading face.

* * * * *